United States Patent
Koike

(10) Patent No.: US 11,377,157 B2
(45) Date of Patent: Jul. 5, 2022

(54) VEHICLE REAR STRUCTURE

(71) Applicant: TOYOTA JIDOSHA KABUSHIKI KAISHA, Toyota (JP)

(72) Inventor: Hiroyuki Koike, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 16/583,369

(22) Filed: Sep. 26, 2019

(65) Prior Publication Data
US 2020/0108874 A1  Apr. 9, 2020

(30) Foreign Application Priority Data

Oct. 3, 2018 (JP) .............................. JP2018-188265

(51) Int. Cl.
*B62D 25/20* (2006.01)
*B60K 15/067* (2006.01)
(Continued)

(52) U.S. Cl.
CPC ........ *B62D 25/2027* (2013.01); *B60K 15/067* (2013.01); *B60L 50/72* (2019.02); *B62D 21/155* (2013.01); *B60K 1/00* (2013.01); *B60K 15/063* (2013.01); *B60K 15/07* (2013.01); *B60K 2015/0638* (2013.01); *B60L 3/0007* (2013.01); *B60Y 2306/01* (2013.01); *B60Y 2400/202* (2013.01); *B62D 25/08* (2013.01); *B62D 25/20* (2013.01); *Y02T 90/40* (2013.01)

(58) Field of Classification Search
CPC .. B62D 25/2027; B62D 21/155; B62D 25/08; B62D 25/20; B60K 15/067; B60K 1/00; B60K 15/07; B60K 2015/0638; B60K 15/03006; B60K 15/063; B60L 50/72; B60L 3/0007; B60L 3/0053; B60Y 2306/01; B60Y 2400/202; Y02T 90/40
USPC .......................................................... 296/204
See application file for complete search history.

(56) References Cited

U.S. PATENT DOCUMENTS 8,393,426 B2 * 3/2013 Takahashi ................ B60K 1/04
                                                                 180/68.5
2013/0187449 A1   7/2013 Mouri et al.
(Continued)

FOREIGN PATENT DOCUMENTS

| CN | 109383637 A | 2/2019 |
| JP | 2004-142588 A | 5/2004 |

(Continued)

*Primary Examiner* — D Glenn Dayoan
*Assistant Examiner* — Dana D Ivey
(74) *Attorney, Agent, or Firm* — Oliff PLC

(57) ABSTRACT

A vehicle rear structure includes: a fuel tank arranged between a pair of side members; and a floor panel. The floor panel includes: a front floor panel and a rear floor panel that cover an upper surface and a rear surface of the fuel tank, and that have a roof section located above height positions of flanges of the side members. The rear floor panel has: a bottom surface located below the height positions of the flanges of the side members; rear vertical wall sections raised upward from both of left and right sides of the bottom surface; and rear flat sections folded to the left and the right at upper ends of the rear left and right vertical wall sections and joined to upper surface sides of the flanges on a vehicle inner side of the pair of side members.

6 Claims, 9 Drawing Sheets

(51) Int. Cl.
  *B62D 21/15*     (2006.01)
  *B60L 50/72*     (2019.01)
  *B60K 1/00*      (2006.01)
  *B60K 15/07*     (2006.01)
  *B62D 25/08*     (2006.01)
  *B60K 15/063*    (2006.01)
  *B60L 3/00*      (2019.01)

(56) References Cited

U.S. PATENT DOCUMENTS

| | | | |
|---|---|---|---|
| 2014/0232141 A1* | 8/2014 | Mochizuki | B62D 25/2027 296/193.07 |
| 2017/0113540 A1* | 4/2017 | Sakurada | B60K 15/03006 |
| 2019/0039446 A1 | 2/2019 | Koike et al. | |

FOREIGN PATENT DOCUMENTS

| | | |
|---|---|---|
| JP | 2009-046014 A | 3/2009 |
| JP | 2013-153566 A | 8/2013 |
| JP | 2017-081210 A | 5/2017 |

* cited by examiner

VEHICLE REAR STRUCTURE

CROSS REFERENCE TO RELATED APPLICATION

This application claims priority to Japanese Patent Application No. 2018-188265 filed on Oct. 3, 2018, which is incorporated herein by reference in its entirety including the specification, claims, drawings, and abstract.

TECHNICAL FIELD

The present disclosure relates to a vehicle rear structure and, in particular, to a vehicle rear structure in which a fuel tank is arranged.

BACKGROUND

Due to recent market trends, development of electric vehicles and fuel cell vehicles has been promoted. In the fuel cell vehicle of the related art, a fuel tank is arranged under a floor of a cabin zone for occupants.

For example, it is disclosed in Patent Document 1 that, in a floor panel constituting a floor surface of the vehicle, a portion thereof on an inner side in a width direction of vehicle rear wheels has an upwardly projected shape in a side view such that an upper portion of a hydrogen tank as the fuel tank can be accommodated below such a portion.

It is disclosed in Patent Document 2 that, with regard to a vehicle body floor of a case where a high-pressure tank as the fuel tank having a cylindrical outer shell is arranged in a portion below a seat, the vehicle body floor from a portion above the high-pressure tank to a front portion of a vehicle body is formed to be curved in a substantially similar shape to the outer shell of the high-pressure tank.

CITATION LIST

Patent Literature

Patent Document 1: JP 2017-081210 A
Patent Document 2: JP 2004-142588 A

SUMMARY

There is a demand for extension of travel distance for electric vehicles and fuel cell vehicles. However, in the case of the fuel cell vehicle, for example, it may be insufficient only to arrange the fuel tank, which stores gas to be supplied to a fuel cell, in the cabin zone. Thus, it is considered to arrange the fuel tank in a collision energy absorption zone on a rear side of the cabin zone in the vehicle body. However, compared to the cabin zone, the collision energy absorption zone is more likely to be affected by a shock of a rear collision. Shock resistant members in the collision energy absorption zone are a rear side member, a floor panel, and the like. Thus, a vehicle rear structure capable of improving shock resistance while accommodating the fuel tank is desired.

A vehicle rear structure according to the present disclosure includes: a left and right pair of side members, each of which extends in a vehicle longitudinal direction on a rear side of a fuel cell vehicle and has a hat shape whose cross section perpendicular to an extending direction is projected upward and which has an opening on a lower side and flanges on both sides of the opening on the lower side; a fuel tank that is arranged between the pair of side members with an axial direction being along a vehicle width direction and that stores gas to be supplied to a fuel cell; and a floor panel that has a front floor panel and a rear floor panel, the front floor panel covering an upper portion of the fuel tank and having a roof section located above height positions of the flanges of the side members, and the rear floor panel having: a bottom surface located below the height positions of the flanges of the side members; rear left and right vertical wall sections raised upward from both of left and right sides of the bottom surface; and rear left and right flat sections folded to the left and the right at upper ends of the rear left and right vertical wall sections and joined to upper surface sides of the flanges on a vehicle inner side of the pair of the side members, and being arranged at the rear of the front floor panel.

According to the above configuration, with regard to the floor panel, the fuel tank is accommodated below the front floor panel, and the rear flat sections of the rear floor panel, which is more likely to receive a vehicle rear collision shock on a vehicle rear side than the front floor panel, is joined to the side members. Since the fuel tank is arranged in a front portion of the floor panel, compared to a case where the fuel tank is arranged in a rear portion of the floor panel, any effect of the rear collision on the fuel tank is suppressed. In addition, since the rear flat sections of the floor panel are joined to the upper surface sides of the flanges of the side members, compared to a case where the rear flat sections of the floor panel are joined to lower surface sides of the flanges, the side members are suppressed from being bent upward by receiving the rear collision shock. In this way, shock resistance can be improved while the fuel tank is accommodated. Furthermore, since the bottom surface of the rear floor panel is lower than the height positions of the flanges of the side members, a space of an accommodation zone for electrical equipment, such as a blowout repair kit and an audio power amplifier, can be expanded.

In the vehicle rear structure according to the present disclosure, the front floor panel may include: front left and right vertical wall sections that fall downward from both of left and right sides of the roof section; and front left and right flat sections that are folded to the left and the right at lower ends of the front left and right vertical wall sections and are joined to the upper surface sides of the flanges on the vehicle inner side of the pair of the side members.

According to the above configuration, since the front flat sections of the floor panel are also joined to the upper surface sides of the flanges of the side members, compared to a case where the front flat sections of the floor panel are joined to the lower surface sides of the flanges, the side members can further be suppressed from being bent upward by receiving the rear collision shock.

In the vehicle rear structure according to the present disclosure, in the floor panel, a rear end of the front floor panel and a front end of the rear floor panel may be joined to each other by welding.

The roof section of the front floor panel is located above the height positions of the flanges of side members, and the bottom surface of the rear floor panel is located below the height positions of the flanges of side members. Due to a height difference from the roof section to the bottom surface, the front floor panel is shaped so as to fall downward from the roof section and being thereafter folded to the left and the right, and the rear floor panel is shaped so as to rise upward from the bottom surface and being thereafter folded to the left and the right. It may be difficult to obtain these shapes by integral molding using a press, for example. According to the above configuration, the front floor panel and the rear floor panel are separately molded. Then, the rear end of the front floor panel and the front end of the rear floor panel are joined by welding. In this way, the front floor panel and the rear floor panel can be integrated. According to this method, a height difference between the front floor panel and the rear floor panel during molding can be approximately half of the height difference in the case where the floor panel is integrally molded as a whole. For this reason, difficulty of a molding process is reduced.

In the vehicle rear structure according to the present disclosure, the floor panel may have: a main body section in which a front portion corresponding to the roof section of the front floor panel and a rear portion corresponding to the rear floor panel are integrally molded; and front left and right wall members having: front left and right flat sections joined to the upper surface sides of the flanges on the vehicle inner side of the left and right pair of side members; and front left and right vertical wall sections raised upward from the front left and right flat sections toward the roof section of the front floor panel. The front left and right wall members may respectively be joined to both of left and right ends of the front portion by welding.

According to the above configuration, a portion having an "outer shape that falls downward from the roof section and is thereafter folded to the left and the right" in the front floor panel may be separately molded as the front wall members. Since a molding process corresponding to the front wall members can be omitted, the front portion corresponding to the roof section of the front floor panel and the rear portion corresponding to the rear floor panel of the floor panel can easily be molded integrally. Thus, joining and welding of the front portion and the rear portion becomes unnecessary.

In the vehicle rear structure according to the present disclosure, the fuel tank may be arranged in a collision energy absorption zone on a vehicle rear side of a cabin zone located in front of vehicle rear wheels. According to the above configuration, compared to a case where the fuel tank is arranged only in the cabin zone, the fuel tank can also be arranged in the collision energy absorption zone. Thus, a vehicle travel distance can be extended.

According to the vehicle rear structure having the above configuration, shock resistance can be improved while the fuel tank is accommodated.

BRIEF DESCRIPTION OF DRAWINGS

Embodiment(s) of the present disclosure will be described based on the following figures, wherein.

DESCRIPTION OF EMBODIMENTS

Figure 1:
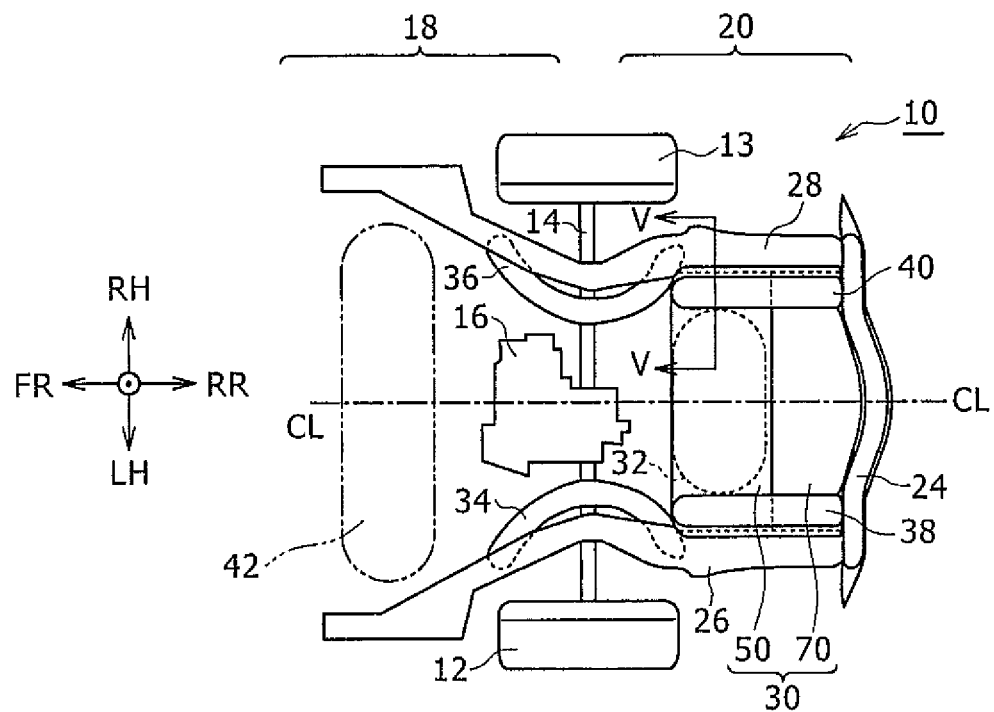
FIG. 1 is a top view of a vehicle rear structure according to an embodiment.

A detailed description will hereinafter be given of embodiments of the present disclosure with reference to the drawings. Dimensions, angles, shapes, and the like, which will be described below, are merely examples for the description and thus can be appropriately changed in accordance with a specification and the like of a vehicle rear structure. In the following description, the same elements in all the drawings will be denoted by the same reference signs, and overlapping description thereon will not be given.

In the drawings, a vehicle longitudinal direction, a vehicle up-down direction, and a vehicle width direction will be indicated by arrows. In the vehicle longitudinal direction, a direction indicated as FR is a vehicle front direction, and a direction indicated as RR is a vehicle rear direction. In the vehicle up-down direction, a direction indicated by UP is a vehicle up direction upward from a road surface 8, and an opposite direction is a vehicle down direction that is a direction toward the road surface 8. In the vehicle width direction, a direction indicated as RH is a vehicle right direction, and a direction indicated as LH is a vehicle left direction. A right side and a left side of the vehicle are a right side and a left side when a front side of the vehicle is seen from a rear side.

Figure 2:
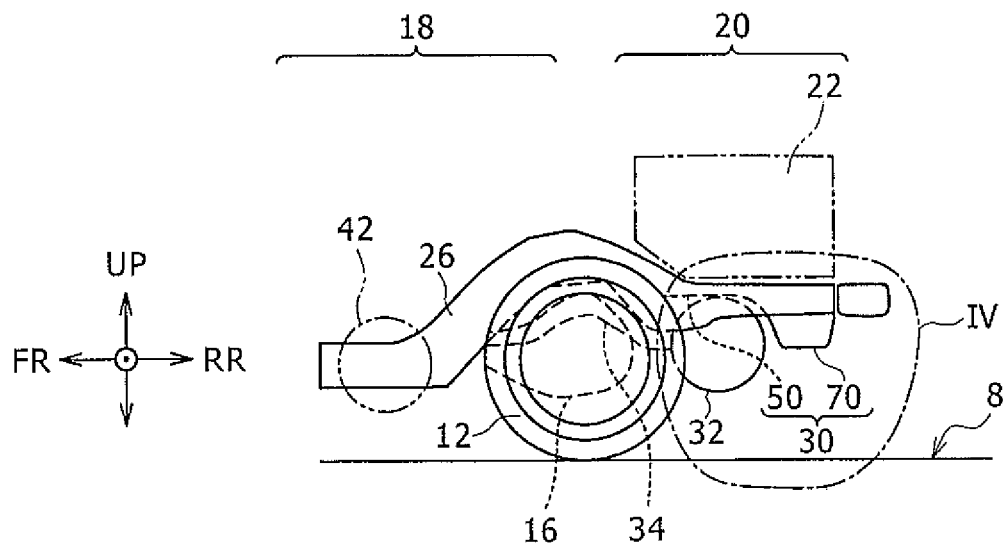
FIG. 2 is a side view of the vehicle rear structure in FIG. 1.

FIG. 1 is a top view of a vehicle rear structure 10 and an adjacent portion as seen from a top of the vehicle. FIG. 2 is a side view of FIG. 1. FIG. 1 and FIG. 2 illustrate left and right rear wheels 12, 13, a rear-wheel axle 14 coupling the left and right rear wheels 12, 13, and a transmission 16 coupled to the rear-wheel axle 14, and FIG. 2 also illustrates the road surface 8. Schematically, a region located in front of the rear wheels 12, 13 is a cabin zone 18, and a region at the rear of the rear wheels 12, 13 is a collision energy absorption zone 20. In the cabin zone 18, rear seats and front seats, which are not illustrated, are arranged. In the collision energy absorption zone 20, a luggage room 22 is provided. The vehicle rear structure 10 is a structure related to a rear portion of the cabin zone 18 and the collision energy absorption zone 20.

In FIG. 1, a center line CL is indicated along the vehicle longitudinal direction. Each element in the vehicle rear structure 10 is likely to be arranged symmetrically about the center line CL along the vehicle longitudinal direction. In the case where the width direction is distinguished with the center line CL being a reference, regardless of the right side and the left side of the vehicle, a direction toward the center line CL and a direction away from the center line CL will respectively be referred to as a vehicle inward direction and a vehicle outward direction.

The vehicle rear structure 10 includes a lower back 24 provided in a rearmost portion of the vehicle, a pair of left and right rear side members 26, 28 extending forward in the vehicle from the lower back 24, a rear floor panel 30, and a fuel tank 32. The reason why "rear" is added to the rear side members 26, 28 and the rear floor panel 30 is that front side members and a front floor panel are provided in a vehicle front structure, which is not illustrated, so as to distinguish the rear side members 26, 28 and the rear floor panel 30 therefrom. The following description will be given on the vehicle rear structure 10. Thus, unless otherwise noted, the rear side members 26, 28 will be referred to as the side members 26, 28, and the rear floor panel 30 will be referred to as the floor panel 30.

The lower back 24 is a vertical wall member that is arranged along the width direction on the rearmost side in the vehicle rear structure 10. A bumper reinforcement and a bumper cover, which are not illustrated, are attached to the lower back 24. In the case where the vehicle receives a rear collision shock, the lower back 24 functions to receive the shock and transmit the shock to the side members 26, 28 and the like.

The pair of side members 26, 28 are rigid members, each of which attenuates the shock transmitted from the lower back 24 and transmits the attenuated shock to a rocker and the like as rigid members with superior shock resistance in the vehicle front structure. Each of the side members 26, 28 has a hat shape in which a cross section perpendicular to an extending direction is similar to a bowler hat. The hat shape is projected upward, has an opening 110 on a lower side, and has flanges 112, 114 on both of left and right sides of the opening 110 (see FIG. 5).

The floor panel 30 is a panel member that is arranged between the pair of side members 26, 28 and constitutes a floor surface in the vehicle rear structure 10. A vehicle rear end of the floor panel 30 is defined by the lower back 24, and a vehicle front end thereof is defined by a rear cross member 90 (see FIG. 4) immediately behind the cabin zone 18. A more detailed configuration of the floor panel 30 will be given later.

The fuel tank 32 is a tank storing gas to be supplied to a fuel cell in a fuel cell vehicle. In the case where hydrogen is used as the gas, the fuel tank 32 is a hydrogen cylinder mounted on the vehicle. Below the floor panel 30, the fuel tank 32 is arranged between the pair of side members 26, 28. An axial direction of the fuel tank 32 is parallel with the vehicle width direction, and a cross-sectional shape thereof that is perpendicular to the axial direction is a substantially circular shape.

In FIG. 1, a pair of left and right rear suspension members 34, 36 are suspension members provided above the rear-wheel axle 14. In the following description, the rear suspension members will be referred to as suspension members unless otherwise noted. With functions similar to those of the side members 26, 28, a pair of left and right second members 38, 40 are shock transmitting members, each of which transmits the rear collision shock received by the lower back 24 to the rocker and the like in the vehicle front structure via the suspension members 34, 36. A detailed description will be given later on a shock transmission path in the case where the vehicle receives the shock of the rear collision or the like.

In FIG. 1 and FIG. 2, as a reference example, a fuel tank 42 as a primary element provided under a floor of the cabin zone 18 is indicated by a two-dot chain line. In order to further extend a vehicle travel distance that is defined by the fuel tank 42 arranged in the cabin zone 18, the fuel tank 32 is arranged in the collision energy absorption zone 20, and the present disclosure relates to the vehicle rear structure 10 in which this fuel tank 32 is arranged.

Next, a detailed description will be given on the floor panel 30. In the case where the fuel tank 32 is arranged in the collision energy absorption zone 20, the following points are considered with regard to the configuration of the floor panel 30.

(1) Capacity of the fuel tank 32 arranged in the collision energy absorption zone 20 is increased as much as possible, so as to extend the vehicle travel distance.

(2) Since the fuel tank 32 is arranged in the collision energy absorption zone 20, in order to improve the shock resistance of the collision energy absorption zone 20, rigidity of the floor panel 30 is improved, and support rigidity of the floor panel 30 for the side members 26, 28 is improved.

(3) A space under a deck board that is considered to be made small due to the arrangement of the fuel tank 32 is expanded as much as possible, so as to secure an area for accommodating a blowout repair kit, an audio power amplifier, and the like.

(4) Since the proven vehicle rear structure is used as the basis, a maximum curb height on the lower side, a deck board height on the upper side, and the shapes and the arrangement of the side members 26, 28 are not changed.

(5) Superior productivity and low cost of the floor panel 30 that satisfies (1) to (4) above are achieved.

Figure 3:
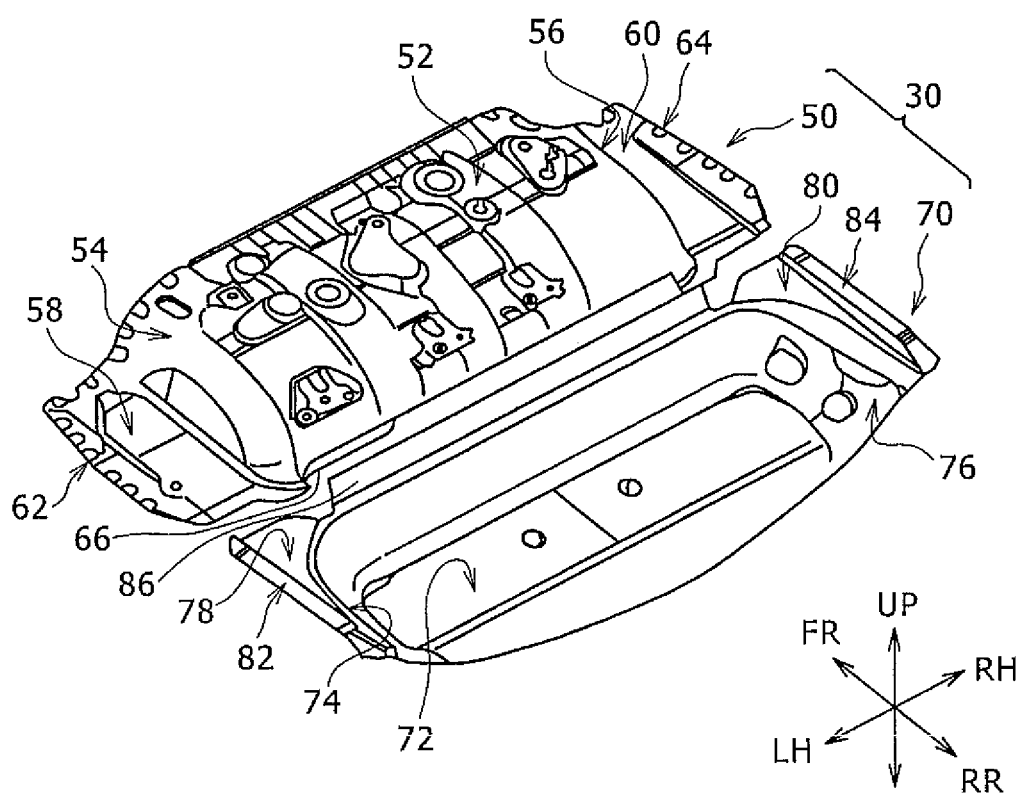
FIG. 3 is a perspective view of a floor panel in the vehicle rear structure according to the embodiment.
Figure 4:
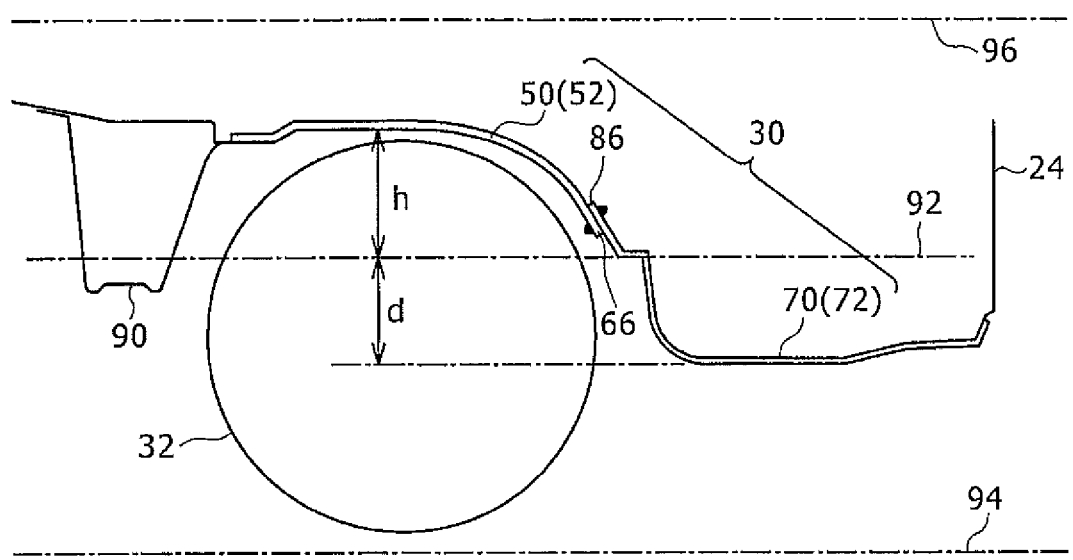
FIG. 4 is a cross-sectional view that is taken along line CL-CL in FIG. 1.
Figure 5:
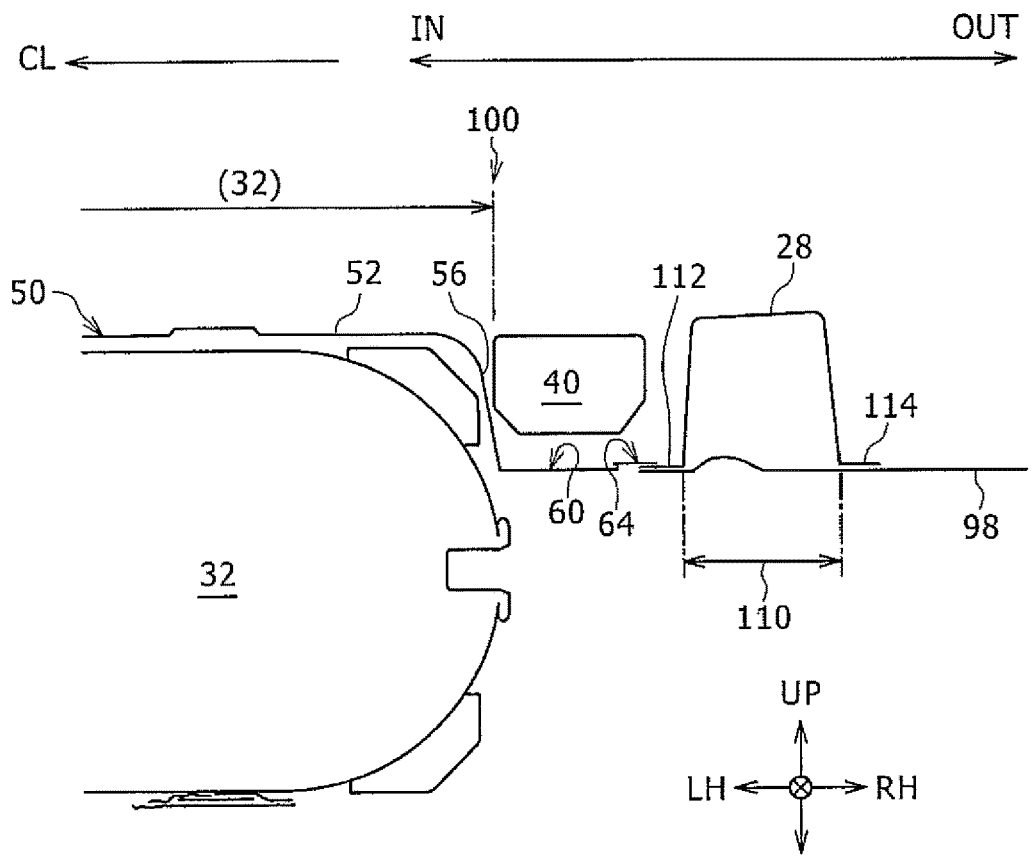
FIG. 5 is a cross-sectional view that is taken along line V-V in FIG. 1.
Figure 6:
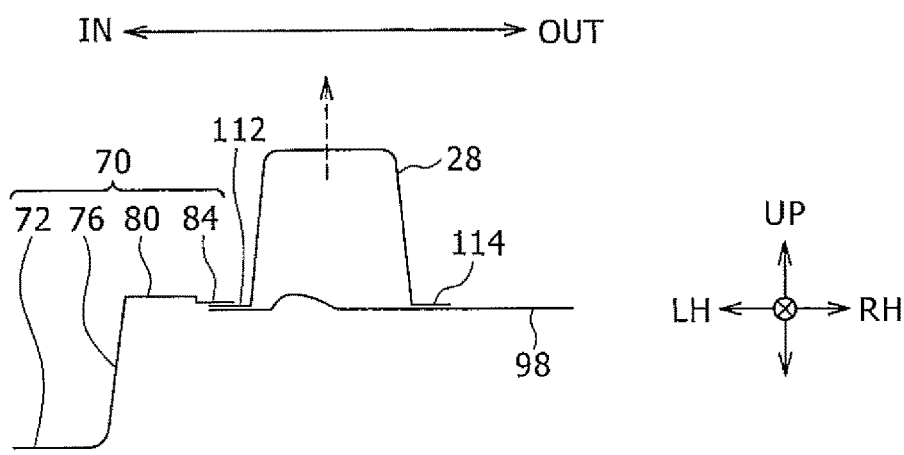
FIG. 6 is a view illustrating joining between a rear floor panel and a side member.
Figure 7:
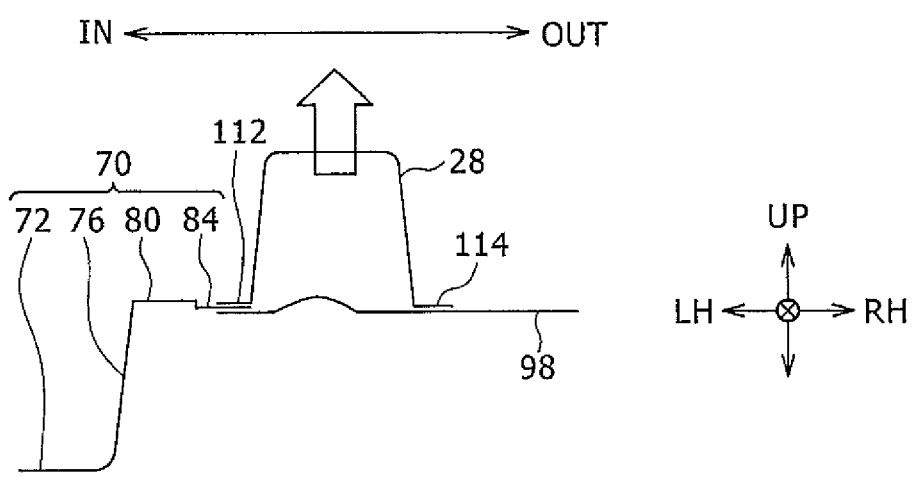
FIG. 7 is a view of a comparative example of FIG. 6.

A detailed description will be given on the floor panel 30, for which the above points are considered, with reference to FIG. 3 to FIG. 7. FIG. 3 is a perspective view of the floor panel 30. FIG. 4 is a cross-sectional view that is taken along line CL-CL in FIG. 1, and FIG. 5 is a cross-sectional view that is taken along line V-V in FIG. 1. FIG. 6 is a view illustrating joining between a rear floor panel and the side member. FIG. 7 is a view of a comparative example of FIG. 6.

The floor panel 30 is a single component integrated by welding and joining. However, before being integrated, the floor panel 30 includes two components that are a front floor panel 50 and a rear floor panel 70. FIG. 3 is a perspective view in which the floor panel 30 before being integrated is seen from the top of the vehicle.

The front floor panel 50 has a roof section 52 that covers the fuel tank 32 from above. A front left vertical wall section 54 and a front right vertical wall section 56 are walls that fall downward from left and right ends of the roof section 52, respectively. A downward angle from the roof section 52 is near 90 degrees and, for example, ranges from approximately 75 degrees to 90 degrees. Such an angle is merely illustrative and thus can be changed in accordance with a specification of the vehicle rear structure 10, and the like. A front left flat section 58 is a flat surface that is folded to the left at a lower end of the front left vertical wall section 54. A front right flat section 60 is a flat surface that is folded to the right at a lower end of the front right vertical wall section 56. A front left connected portion 62 is provided at a left end of the front left flat section 58, and is a portion that is joined to an upper surface of the flange on the vehicle inner side of the side member 26, which extends on the left side in the vehicle, by welding. A front right connected portion 64 is provided at a right end of the front right flat section 60, and is a portion that is joined to an upper surface of the flange 112 on the vehicle inner side of the side member 28, which extends on the right side in the vehicle, by welding.

That the front left connected portion 62 and the front right connected portion 64 of the front floor panel 50 are respectively joined to the upper surfaces of the flanges of the side members 26, 28 indicates that the front floor panel 50 is arranged over the side members 26, 28 and is welded thereto from above. Thus, a height position of the roof section 52 of the front floor panel 50 is located higher than positions of the flanges of the side members 26, 28.

A rear end 66 of the front floor panel 50 is an end, which falls downward along a rear surface of the fuel tank 32, in the roof section 52. The rear end 66 of the front floor panel 50 is joined to a front end 86 of the rear floor panel 70, which will be described next, by welding. In this way, the integrated floor panel 30 is formed.

The rear floor panel 70 is arranged behind the front floor panel 50, and has a lower bottom surface 72 than the front end 86, which is joined to the rear end 66 of the front floor panel 50 by welding. A rear left vertical wall section 74 and a rear right vertical wall section 76 are walls that are raised upward from left and right ends of the bottom surface 72, respectively. An upward angle from the bottom surface 72 is near 90 degrees and, for example, ranges from approximately 75 degrees to 90 degrees. Such an angle is merely illustrative and thus can be changed in accordance with the specification of the vehicle rear structure 10, and the like. A rear left flat section 78 is a flat surface that is folded to the left at an upper end of the rear left vertical wall section 74. A rear right flat section 80 is a flat surface that is folded to the right at an upper end of the rear right vertical wall section 76. A rear left connected portion 82 is provided at a left end of the rear left flat section 78, and is a portion that is joined to the upper surface of the flange on the vehicle inner side of the side member 26, which extends on the left side in the vehicle, by welding. A rear right connected portion 84 is provided at a right end of the rear right flat section 80, and is a portion that is joined to an upper surface of the flange 112 on the vehicle inner side of the side member 28, which extends on the right side in the vehicle, by welding.

That the rear left connected portion 82 and the rear right connected portion 84 of the rear floor panel 70 are respectively joined to the upper surfaces of the flanges of the side members 26, 28 indicates that the rear floor panel 70 is arranged over the side members 26, 28 and is welded thereto from above. Thus, a height position of the bottom surface 72 of the rear floor panel 70 is located lower than the positions of the flanges of the side members 26, 28.

In the rear floor panel 70, the front end 86, which is joined to the rear end 66 of the front floor panel 50 by welding, is an end raised upward from a front end side of the bottom surface 72.

FIG. 4 is the cross-sectional view that is taken along line CL-CL in FIG. 1, and corresponds to an enlarged view of a section IV surrounded by a one-dot chain line in FIG. 2. FIG. 4 illustrates a height position 92 of the flange of each of the side members 26, 28, a maximum curb position 94 indicating a limit on the lower side of the vehicle, and a height position 96 of the deck board in the proven vehicle rear structure. In the following description, the height position 92 of the flange of each of the side members 26, 28 will be referred to as the height position 92 of the side member flange unless otherwise noted. The maximum curb position 94 for the vehicle is a height position that is calculated by adding a margin height to a road surface contact position of each of the rear wheels 12, 13 of the vehicle set as a reference position GL. The margin height is defined such that each of the elements of the vehicle rear structure 10 does not contact a curb placed on the road surface 8. An example of the margin height is approximately 150 mm. Such a height is merely illustrative and thus can be changed in accordance with a specification of the vehicle and the like.

FIG. 4 illustrates, in the floor panel 30, the roof section 52 of the front floor panel 50, the bottom surface 72 of the rear floor panel 70, and a joined state between the rear end 66 of the front floor panel 50 and the front end 86 of the rear floor panel 70. A front end of the front floor panel 50 is joined to the rear crossmember 90, and a rear end of the rear floor panel 70 is joined to the lower back 24.

The fuel tank 32 is arranged to be distanced forward in the vehicle from the lower back 24. In this way, even in the case where the vehicle receives the rear collision shock, it is possible to suppress the shock from being directly applied to the fuel tank 32. Between the maximum curb position 94 and the deck board height position 96, the fuel tank 32 is arranged at a such a height position that an upper portion thereof is located above the height position 92 of the side member flange. In the related art, both ends in the width direction of the floor panel are joined to the flanges of the side members 26, 28. Compared to an outer diameter of the fuel tank of the case where the fuel tank is arranged below the floor panel in the related art, an outer diameter of the fuel tank 32, which is arranged as illustrated in FIG. 4, is increased, and thus the capacity in a radial direction of the fuel tank 32 is increased.

Since the upper portion of the fuel tank 32 is located above the height position 92 of the side member flange, the height position of the roof section 52 of the front floor panel 50 becomes higher than the height position 92 of the side member flange. Such a height difference is indicated by h.

A space between the height position of the floor panel 30 and the deck board height position 96 is used as an accommodation zone for electrical equipment such as the blowout repair kit and the audio power amplifier, in addition to the luggage room 22 used by a user. With regard to the floor panel in the related art, the height position 92 of the side member flange is the same as the height position of the floor panel. Thus, the space between the height position 92 of the side member flange and the deck board height position 96 can be used as the accommodation zone.

Compared to the related art, in the case where the floor panel 30 in FIG. 4 is used, the height position of the roof section 52 is higher than the height position 92 of the side member flange by h. Thus, the space for the accommodation zone is made smaller by such a height. For this reason, the height position of the bottom surface 72 of the rear floor panel 70 is set to be lower than the height position 92 of the side member flange. In FIG. 4, a height difference between the height position 92 of the side member flange and the height position of the bottom surface 72 of the rear floor panel 70 is indicated by d. The height difference d of the rear floor panel 70 from the height position 92 of the side member flange is set to be approximately equal to the height difference h of the front floor panel 50 therefrom. In this way, it is possible to secure the space for the accommodation zone whose size is approximately equal to that in the related art.

The roof section 52 and the bottom surface 72 of the floor panel 30 are arranged above and below the height position 92 of the side member flange, respectively. Thus, a cross-sectional shape of the floor panel 30 that is perpendicular to the vehicle width direction is not a flat plate shape but is a substantially S shape. In this way, the rigidity of the floor panel 30 along the vehicle longitudinal direction is improved, and the shock resistance of the vehicle rear structure 10 is improved.

FIG. 5 is the cross-sectional view that is taken along line V-V in FIG. 1, and illustrates an arrangement relationship between the fuel tank 32 and the front floor panel 50 on the vehicle right side (RH). A state of the fuel tank 32 on the vehicle left side (LH) is symmetrical about the center line CL except for a fact that a valve is provided on the fuel tank 32. In FIG. 5, LH and RH are indicated for the vehicle width direction. In addition, a direction toward the center line CL and the vehicle inward direction are indicated as IN, and the vehicle outward direction is indicated as OUT.

Similar to FIG. 4, FIG. 5 illustrates the shape and an arrangement position of the side member 28 in the proven vehicle rear structure. On the IN side of the side member 28, the second member 40 is arranged substantially parallel to the side member 28. A pan side 98 is joined to a lower surface side of the flange 112 on the IN side of the side member 28 and the flange 114 on the OUT side of the side member 28. With the floor panel 30, the pan side 98 constitutes a rear under section of the vehicle rear structure 10. In this state, in the vehicle width direction, a position 100 of a wall on the IN side of the second member 40 corresponds to an arrangement limit position on the OUT side of the fuel tank 32.

In the front floor panel 50, the roof section 52, the front right vertical wall section 56, the front right flat section 60, and the front right connected portion 64 are illustrated.

The front right vertical wall section 56 falls downward at the angle near 90 degrees from the right end of the roof section 52. In this way, the position on the OUT side of the fuel tank 32 can be set to be substantially the same as the position 100 of the wall on the IN side of the second member 40. Thus, in the case where the arrangement positions of the side member 28 and the second member 40 remain as they are, the capacity in the axial direction of the fuel tank 32 can be increased to the arrangement limit position.

The front right connected portion 64 is joined to the upper surface of the flange 112 on the vehicle inner side of the side member 28 by welding. That is, the front floor panel 50 of the floor panel 30 is arranged over the side member 28 and is welded thereto from above. Just as described, the front floor panel 50 has a function of pressing the side member 28 from above.

The description has been given above on the RH side of the front floor panel 50. A configuration on the RH side of the rear floor panel 70 is similar to the configuration illustrated in FIG. 5 except that the rear right vertical wall section 76 is raised upward to the side member 28 side from the bottom surface 72. FIG. 6 is a view illustrating joining between the rear floor panel 70 and the side member 28.

FIG. 6 illustrates the bottom surface 72, the rear right vertical wall section 76, the rear right flat section 80, and the rear right connected portion 84 of the rear floor panel 70. The rear right vertical wall section 76 is raised upward at the angle near 90 degrees from the right end of the bottom surface 72. The rear right connected portion 84 is joined to the upper surface of the flange 112 on the vehicle inner side of the side member 28 by welding. That is, the rear floor panel 70 of the floor panel 30 is arranged over the side member 28 and is welded thereto from above. That is, the rear floor panel 70 has a function of pressing the side member 28 from above. Since the rear floor panel 70 is close to the lower back 24 in comparison with the front floor panel 50, the rear floor panel 70 is likely to receive the collision shock. However, in such a case, the rear floor panel 70 first functions to suppress the side member 28 from being bent upward by receiving the rear collision shock. In FIG. 6, a broken arrow indicates that the side member 28 is slightly bent upward. Thus, the support rigidity of the floor panel 30 for the side member 28 is improved, and the shock resistance of the vehicle rear structure 10 is improved.

As a comparative example of FIG. 6, FIG. 7 illustrates a case where the rear right connected portion 84 is joined to a lower surface of the flange 112 on the vehicle inner side of the side member 28 by welding. In this configuration, the rear floor panel 70 does not press the side member 28 from above. Thus, when receiving the rear collision shock, the side member 28 is bent upward. In FIG. 7, a solid white arrow indicates that the side member 28 is significantly bent upward.

The description has been given so far on the configuration of the floor panel 30. In the floor panel 30, the roof section 52 of the front floor panel 50 is located above the height position of the flange of side member 28, and the bottom surface 72 of the rear floor panel 70 is located below the height position of the flange of side member 28. Due to the height difference from the roof section 52 to the bottom surface 72, the front floor panel 50 has such an outer shape that both of the ends in the width direction fall downward from the roof section 52 and are thereafter folded to the left and the right. Meanwhile, the rear floor panel 70 has an outer shape such that both of the ends in the width direction are raised upward from the bottom surface 72 and are thereafter folded to the left and the right. It may be difficult to obtain these shapes from a single original plate member by integral molding using a press, for example.

The floor panel 30 is not integrally molded as a whole. Instead, the front floor panel 50 and the rear floor panel 70 are separately molded. Then, the rear end 66 of the front floor panel 50 and the front end 86 of the rear floor panel 70 are joined by welding to be integrated. The front floor panel 50 and the rear floor panel 70 are separate elements. Thus, the height difference between the front floor panel 50 and the rear floor panel 70 during molding can be approximately half of the height difference in the case where the floor panel 30 is integrally molded as a whole. For this reason, difficulty of a molding process is reduced. In this way, superior productivity and cost of the floor panel 30 can be achieved.

Figure 8:
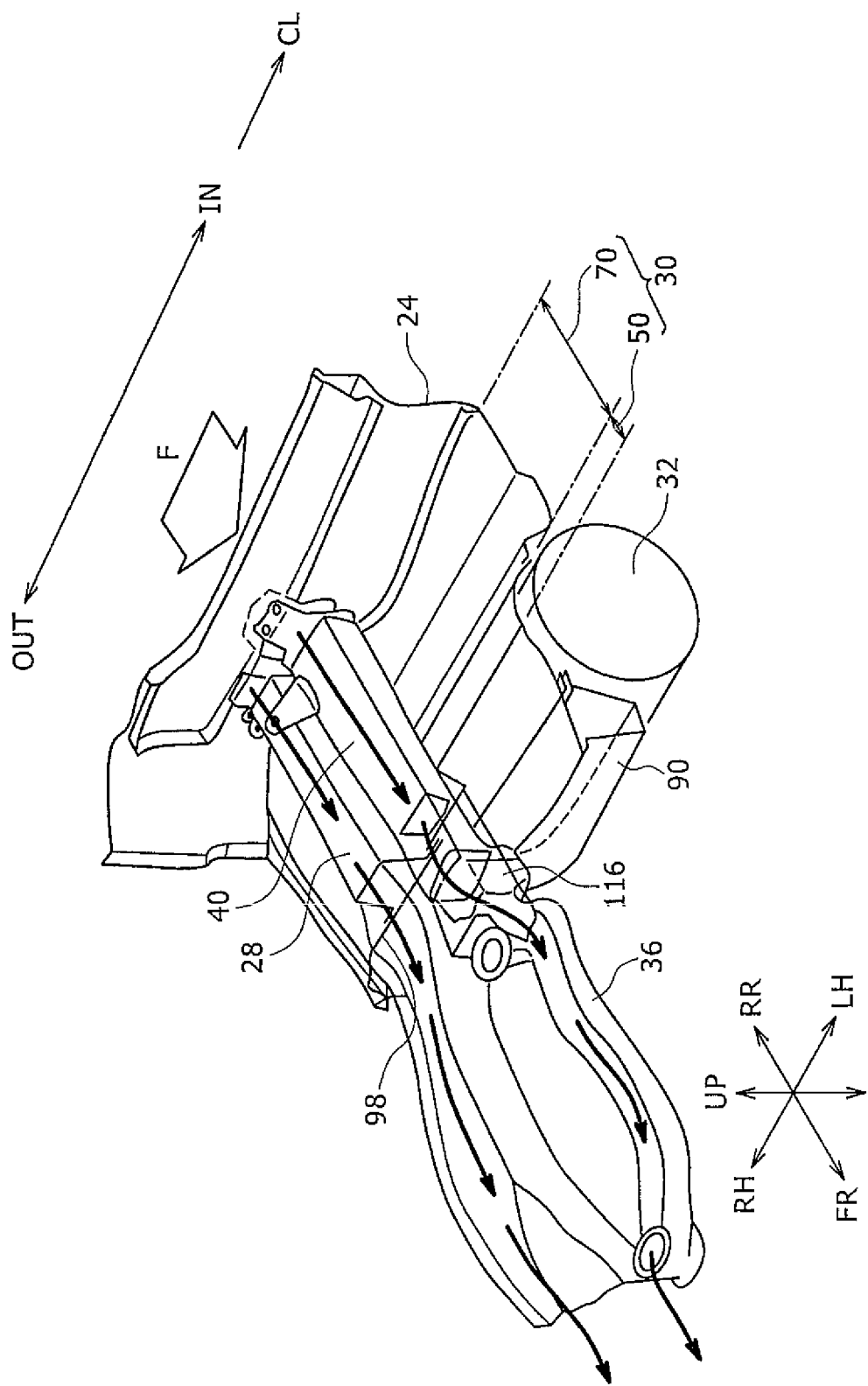
FIG. 8 is a view of a rear collision shock transmission path in the vehicle rear structure of FIG. 1.

FIG. 8 illustrates a rear collision shock transmission path in the vehicle rear structure 10. FIG. 8 is a perspective view of a portion on the RH side of the vehicle rear structure 10 that is seen from the center line CL side and from above. Since each of the elements has already been described, the detailed description thereon will not be given. An intermediate transmission member 116 is a member that has a function of transmitting the shock transmitted to the second member 40 to the suspension member 36.

When rear collision shock F is applied to the lower back 24, the shock is transmitted to the side member 28 and the second member 40, and, as indicated by solid lines for the side member 28 and the second member 40, is transmitted to the rocker and the like, which are not illustrated. In addition, as described with reference to FIG. 5 and FIG. 6, both of the ends in the width direction of the floor panel 30 are joined to the upper surfaces of the flanges on the vehicle inner side of the side member 28. Thus, the support rigidity of the floor panel 30 for the side member 28 is improved, and the side member 28 is suppressed from being bent upward by the shock F. Due to these facts, the shock resistance of the vehicle rear structure 10, in which the fuel tank 32 is arranged, is improved, and safety of the fuel tank 32, which is arranged in the collision energy absorption zone 20, is secured.

Figure 9:
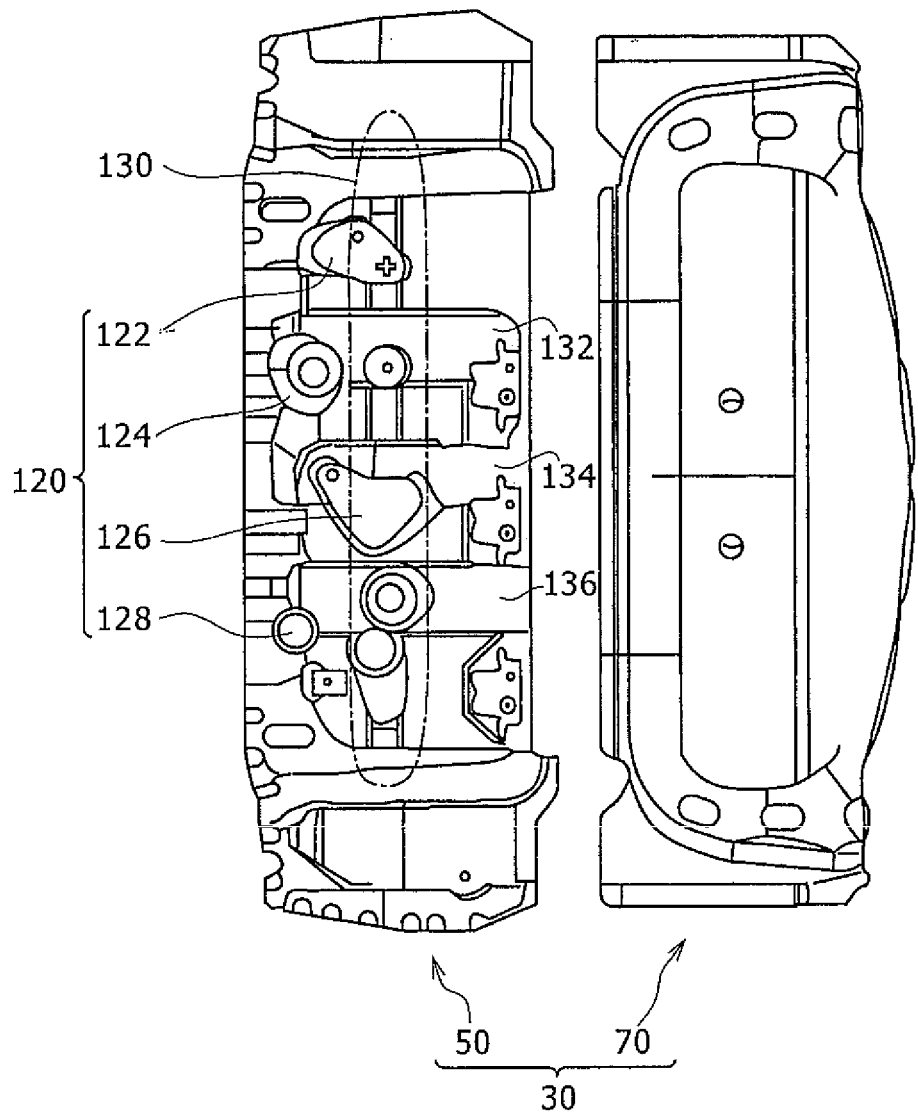
FIG. 9 is a top view of the floor panel in the vehicle rear structure according to the embodiment.

FIG. 9 is a top view of the floor panel 30. Here, two types of beads 120, 130 used to improve noise resistance against vehicle vibrations are illustrated. The bead is a partially bulged portion that is formed for the purpose of reinforcing a surface. The bead 120 improves the noise resistance by suppressing surface vibrations received from the upper surface side of the fuel tank 32, and a plurality of the beads 120 are provided on an outer circumferential surface of the front floor panel 50. In an example illustrated in FIG. 9, four beads 122, 124, 126, 128 are provided as the beads 120. The bead 130 improves the noise resistance by suppressing vibrations in the width direction of the fuel tank 32. The bead 130 is arranged in intermediate portions of beads 132, 134, 136 and extends in the vehicle width direction. Bands are arranged along an outer circumferential surface of the fuel tank 32 so as to fix the fuel tank 32 and the bands run through holes provided in the beads 132, 134, 136. By providing the beads 120, 130 on the floor panel 30, the vibrations of the fuel tank 32 caused by the vibrations of the vehicle are suppressed. Thus, the noise resistance of the vehicle is improved.

Figure 10:
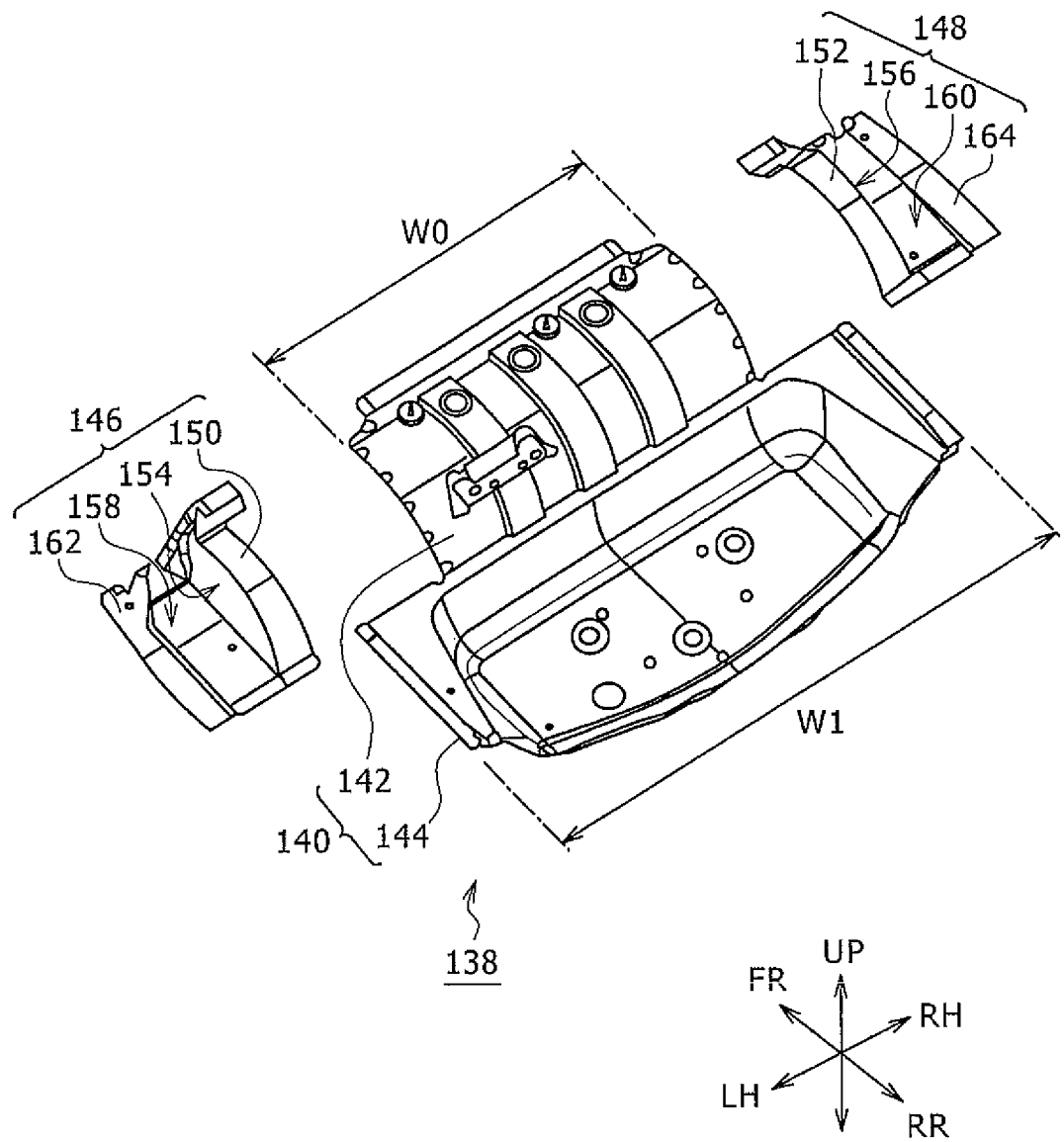
FIG. 10 is a perspective view of a floor panel in another embodiment.

FIG. 10 is a perspective view of a floor panel 138 in another embodiment. The floor panel 138 includes: a main body section 140 that is integrally molded; and a front left wall member 146 and a front right wall member 148, each of which is integrated with the main body section 140 by welding. The floor panel 138 is a single component integrated by welding and joining. However, before being integrated, the floor panel 138 is three components of the main body section 140, the front left wall member 146, and the front right wall member 148. FIG. 10 is the perspective view of the floor panel 138 before being integrated that is seen from the top of the vehicle.

In the main body section 140, a front portion 142, which corresponds to the roof section 52 of the front floor panel 50 described with reference to FIG. 4, and a rear portion 144, which corresponds to the rear floor panel 70 described with reference to FIG. 4, are integrally molded. The rear portion 144 includes all the elements constituting the rear floor panel 70 in FIG. 4. Compared to the front floor panel 50 in FIG. 4, the front portion 142 does not include the front left and right wall sections at the left and right ends of the roof section 52, the left and right front flat sections, and the left and right front connected portions. These portions are provided in the front left wall member 146 and the front right wall member 148 as separate components from the main body section 140. A length W0 of the front portion 142 along the width direction is shorter than a length W1 of the rear portion 144 along the width direction. With this configuration, the front portion 142 and the rear portion 144 can be relatively easily molded integrally, and joining between the front portion 142 and the rear portion 144 by welding is unnecessary.

The front left wall member 146 includes an upper left connected portion 150 that corresponds to the left end of the roof section 52 of the front floor panel 50 in FIG. 4. A front left vertical wall section 154, a front left flat section 158, and a front left connected portion 162 respectively correspond to the front left vertical wall section 54, the front left flat section 58, and the front left connected portion 62 of the front floor panel 50. Note that with the front left flat section 158 as a reference, the front left vertical wall section 154 differs from the front left flat section 54 in a point of being raised upward from the front left flat section 158 toward the upper left connected portion 150. However, since the rest is the same as what has been described with reference to FIG. 4, detailed description will not be given.

The front right wall member 148 includes an upper right connected portion 152 that corresponds to the roof section 52 of the front floor panel 50 in FIG. 4. A front right vertical wall section 156, a front right flat section 160, and a front right connected portion 164 respectively correspond to the front right vertical wall section 56, the front right flat section 60, and the front right connected portion 64 of the front floor panel 50. Thus, a detailed description thereon will not be given.

A left end of the front portion 142 of the main body section 140 is joined to the upper left connected portion 150 of the front left wall member 146 by welding. A right end of the front portion 142 of the main body section 140 is joined to the upper right connected portion 152 of the front right wall member 148 by welding. In this way, the integrated floor panel 138 is formed. The integrated floor panel 138 exhibits similar operational effects to the integrated floor panel 30.

In the above description, in order to increase the capacity in the width direction of the fuel tank 32, the floor panel 30 is provided with: the front left and right vertical wall sections 54, 56, each of which falls downward at an angle near 90 degrees from the roof section 52; and the rear left and right vertical wall sections 74, 76, each of which is raised at an angle near 90 degrees from the bottom surface 72. Thus, it is difficult to integrally mold the floor panel 30. The front floor panel 50 and the rear floor panel 70 are molded as the separate components. Then, the front floor panel 50 and the rear floor panel 70 are joined by welding, so as to form the integrated floor panel 30.

As a comparative example, a description will be given for a case where an oblique wall section that is gently raised upward is used instead of the vertical wall section that falls downward or is raised upward at the angle near 90 degrees. Depending on the gentleness of being raised upward or falling downward, the front floor panel and the rear floor panel can be integrally molded instead of being provided as separate components. By using the oblique wall section instead of the vertical wall section, the capacity in the width direction of the fuel tank is reduced.

Figure 11:
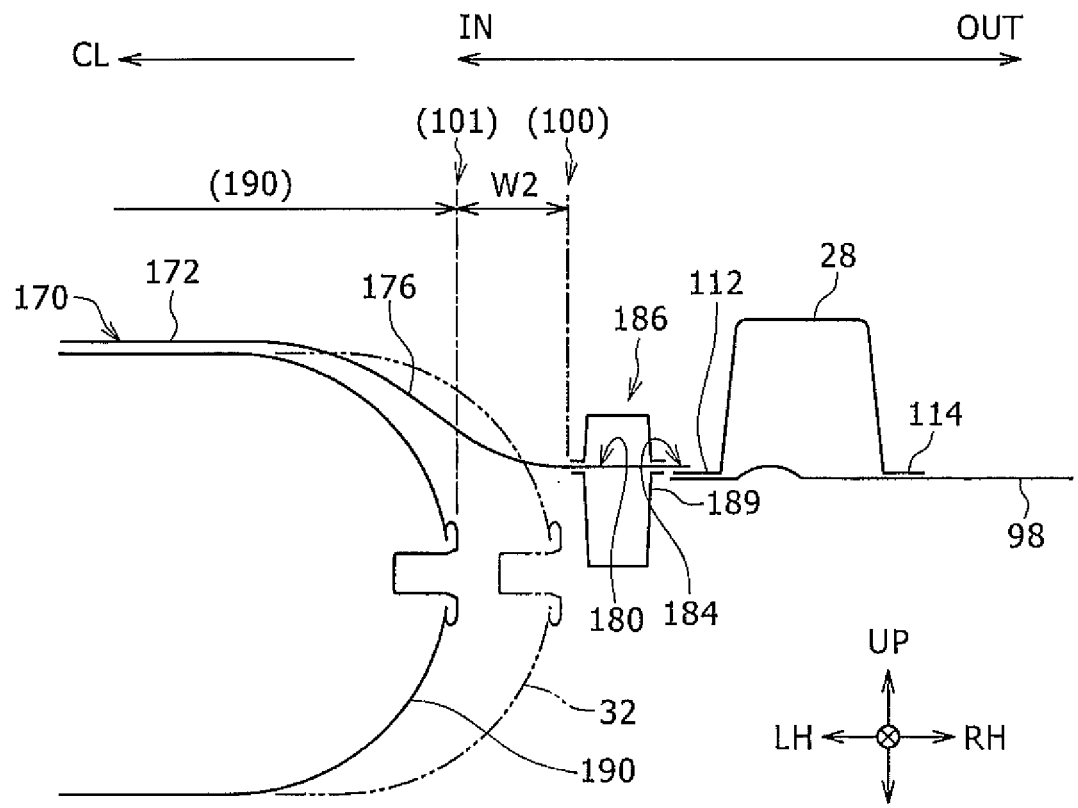
FIG. 11 is a view of a vehicle rear structure as a comparative example in which a floor panel can be formed integrally but capacity of a fuel tank in a width direction is reduced.

FIG. 11 is a view corresponding to FIG. 5, and illustrates here, as a comparative example, a front floor panel 170 of a floor panel that has a shape of being gently raised upward or falling downward, instead of using the vertical wall section that falls downward or is raised upward at the angle near 90 degrees. The front floor panel 170 includes: a roof section 172; a front right oblique wall section 176 that gently falls downward from the roof section 172; a front right flat section 180; and a front right connected portion 184. The roof section 172, the front right flat section 180, and the front right connected portion 184 respectively correspond to the roof section 52, the front right flat section 60, and the front right connected portion 64 of the front floor panel 50, which have been described with reference to FIG. 5. Thus, a detailed description thereon will not be given.

FIG. 11 illustrates a fuel tank 190 that is arranged below the front floor panel 170. As a reference, the fuel tank 32, which has been described with reference to FIG. 5, is indicated by a two-dot chain line. Here, the second member can be constructed of two hat-shaped members that are vertically symmetrical. Thus, in the example illustrated in FIG. 11, as the second member, a pair of hat-shaped members 186, 189 that hold the front floor panel 170 therebetween in the up-down direction is illustrated. In this configuration, the front right oblique wall section 176 gently falls downward along the width direction from the roof section 172 toward the front right flat section 180. Accordingly, in this state, in the vehicle width direction, the position 100 of a wall on the IN side of each of the paired hat-shaped members 186, 189 as the second member cannot be set as an arrangement limit position on the OUT side of the fuel tank 190. A position that is further separated to the IN side from the position 100 of a wall on the IN side of the second member 186 by W2 is set as an arrangement limit position 101 on the OUT side of the fuel tank 190.

Thus, on the RH side, capacity in the width direction of the fuel tank 190 is reduced by approximately W2 from the capacity in the width direction of the fuel tank 32. Similarly, also on the LH side, the capacity in the width direction of the fuel tank 190 is reduced by approximately W2 from the capacity in the width direction of the fuel tank 32. Thus, on both the RH side and the LH side, the capacity in the width direction of the fuel tank 190 is reduced by approximately (2×W2) from the capacity in the width direction of the fuel tank 32. As a result, the vehicle travel distance is not extended sufficiently. On the contrary, in the case where the floor panel 30, which is configured as described with reference to FIG. 1 to FIG. 10, the fuel tank 32 can be arranged up to the maximum arrangement limit position while the side members 26, 28 and the like in the proven vehicle rear structure impose a restriction thereon. Thus, the vehicle travel distance can be extended to the maximum.

The invention claimed is:

1. A vehicle rear structure for a fuel cell vehicle, the vehicle rear structure comprising:
   a pair of left and right side members, each of which extends in a vehicle longitudinal direction on a rear side of the fuel cell vehicle and has a hat shape whose cross section perpendicular to an extending direction is projected upward and which has an opening on a lower side and flanges on both sides of the opening on the lower side;
   a fuel tank that is arranged between the pair of side members with an axial direction being along a vehicle width direction and that stores gas to be supplied to a fuel cell; and
   a floor panel that has a front floor panel and a rear floor panel, wherein,
   the front floor panel covering an upper portion of the fuel tank and having a roof section located above height positions of the flanges of the side members,
   the rear floor panel being arranged at the rear of the front floor panel and having a bottom surface located below the height positions of the flanges of the side members; rear left and right vertical wall sections raised upward from both of left and right sides of the bottom surface, and rear left and right flat sections extended to the left and the right from upper ends of the rear left and right vertical wall sections and joined to upper surface sides of the flanges on a vehicle inner side of the pair of the side members; and
   the front floor panel includes:
      front left and right vertical wall sections that fall downward from both of left and right sides of the roof section, and
      front left and right flat sections that are folded to the left and the right at lower ends of the front left and right vertical wall sections and are joined to the upper surface sides of the flanges on the vehicle inner side of the pair of the side members.

2. The vehicle rear structure according to claim 1, wherein in the floor panel, a rear end of the front floor panel and a front end of the rear floor panel are joined to each other by welding.

3. The vehicle rear structure according to claim 2, wherein the floor panel includes:
   a main body section in which a front portion corresponding to the roof section of the front floor panel and a rear portion corresponding to the rear floor panel are integrally molded; and
   front left and right wall members having front left and right flat sections joined to the upper surface sides of the flanges on the vehicle inner side of the left and right pair of side members, and front left and right vertical wall sections raised upward from the front left and right flat sections toward the roof section of the front floor panel, and
   the front left and right wall members are respectively joined to both of left and right ends of the front portion by welding.

4. The vehicle rear structure according to claim 1, wherein the floor panel includes:
   a main body section in which a front portion corresponding to the roof section of the front floor panel and a rear portion corresponding to the rear floor panel are integrally molded; and
   front left and right wall members having front left and right flat sections joined to the upper surface sides of the flanges on the vehicle inner side of the pair of side members, and front left and right vertical wall sections raised upward from the front left and right flat sections toward the roof section of the front floor panel, and
   the front left and right wall members are respectively joined to both of left and right ends of the front portion by welding.

5. The vehicle rear structure according to claim 1, wherein the fuel tank is arranged in a collision energy absorption zone on a vehicle rear side of a cabin zone located in front of vehicle rear wheels.

6. A vehicle rear structure for a fuel cell vehicle, the vehicle rear structure comprising:
   a pair of left and right side members, each of which extends in a vehicle longitudinal direction on a rear side of the fuel cell vehicle and has a hat shape whose cross section perpendicular to an extending direction is projected upward and which has an opening on a lower side and flanges on both sides of the opening on the lower side;
   a fuel tank that is arranged between the pair of side members with an axial direction being along a vehicle width direction and that stores gas to be supplied to a fuel cell; and
   a floor panel that has a front floor panel and a rear floor panel, wherein,
   the front floor panel covering an upper portion of the fuel tank and having a roof section located above height positions of the flanges of the side members,
   the rear floor panel being arranged at the rear of the front floor panel and having a bottom surface located below the height positions of the flanges of the side members; rear left and right vertical wall sections raised upward from both of left and right sides of the bottom surface, and rear left and right flat sections extended to the left and the right from upper ends of the rear left and right vertical wall sections and joined to upper surface sides of the flanges on a vehicle inner side of the pair of the side members;
   the floor panel includes:
      a main body section in which a front portion corresponding to the roof section of the front floor panel and a rear portion corresponding to the rear floor panel are integrally molded, and
      front left and right wall members having front left and right flat sections joined to the upper surface sides of the flanges on the vehicle inner side of the pair of side members, and front left and right vertical wall sections raised upward from the front left and right flat sections toward the roof section of the front floor panel; and
   the front left and right wall members are respectively joined to both of left and right ends of the front portion by welding.

* * * * *